(12) United States Patent
Benco et al.

(10) Patent No.: US 7,515,042 B2
(45) Date of Patent: Apr. 7, 2009

(54) MOBILE SURVEILLANCE

(75) Inventors: David S. Benco, Winfield, IL (US); Kevin J. Overend, Elmhurst, IL (US); Baoling S. Sheen, Naperville, IL (US); Sandra Lynn True, St. Charles, IL (US); Kenneth J. Voight, Sugar Grove, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 166 days.

(21) Appl. No.: 11/440,906

(22) Filed: May 25, 2006

(65) Prior Publication Data

US 2007/0273501 A1    Nov. 29, 2007

(51) Int. Cl.
  G08B 1/08    (2006.01)
  H04Q 7/00    (2006.01)
  H04H 60/09    (2008.01)

(52) U.S. Cl. ............................ 340/539.11; 340/539.18; 455/3.04

(58) Field of Classification Search ............ 340/286.02, 340/539.11, 539.16–539.25, 541, 545.2, 340/565, 5.81, 5.8, 825.52; 455/3.03, 3.04, 455/404.1, 404.2, 439, 410, 411, 415; 379/15.01, 379/15.02, 93.25, 102.01–102.07
See application file for complete search history.

(56) References Cited

U.S. PATENT DOCUMENTS 6,078,649 A * 6/2000 Small et al. .................... 379/39
6,369,705 B1 * 4/2002 Kennedy ..................... 340/506
6,798,345 B2 * 9/2004 Satoh ....................... 340/573.1
6,943,682 B1 * 9/2005 Dowens et al. .............. 340/506
7,009,510 B1 * 3/2006 Douglass et al. ............ 340/531
7,227,529 B2 * 6/2007 Suomela ..................... 345/156
7,292,142 B2 * 11/2007 Simon et al. ............ 340/539.17
2002/0063799 A1   5/2002  Ortiz et al.
2003/0174210 A1   9/2003  Vimpari et al.
2004/0136388 A1   7/2004  Schaff
2005/0068175 A1 * 3/2005  Faulkner et al. ............. 340/541
2006/0066720 A1   3/2006  Renkis
2006/0066729 A1   3/2006  Renkis
2006/0070107 A1   3/2006  Renkis
2006/0072013 A1   4/2006  Renkis
2006/0072757 A1   4/2006  Renkis
2007/0205888 A1 * 9/2007  Lee et al. ................ 340/539.18

* cited by examiner

Primary Examiner—Benjamin C Lee
Assistant Examiner—Jennifer Mehmood

(57) ABSTRACT

A mobile communications network is provisioned to provide surveillance services. A subscriber database is adapted to include surveillance service information. For example, the subscriber database is adapted to include an IP address of a surveillance sensor such as a camera or microphone associated with a subscriber and located at a place to be monitored. A mobile switching center is adapted to determine a surveillance session start time, receive the surveillance sensor IP address from the subscriber database and connect to the surveillance sensor associated with the IP address. The MSC is also adapted to receive surveillance information from the surveillance sensor and transmit the surveillance information to a mobile communications device of the subscriber. The mobile communications device presents the surveillance information to the user. For example, images are displayed and/or audio signals are produced. The subscriber database can be provisioned by the subscriber through a web portal.

20 Claims, 3 Drawing Sheets her, et al., which was published on Sep.

MOBILE SURVEILLANCE

BACKGROUND OF THE INVENTION

The present disclosure is related to the art of remote surveillance or monitoring. More particularly, embodiments adapt aspects of mobile, cellular and/or wireless communication networks to accommodate provisioning and implementation of subscriber services that allow for remote and/or mobile surveillance or monitoring of one or more locations.

People often have concerns regarding the state of or activities occurring at remote locations. For example, a parent that is away from a child may want to observe or listen to activities occurring at a home or other childcare center. A traveler may want to determine the state of a home, vacation home or remotely located recreational vehicle, such as a boat located at a dock or an airplane located at an air field or in a hanger.

At the same time, mobile communications devices, such as cellular telephones, personal digital assistants and laptop computers adapted to communicate over cellular and other wireless communication networks, are readily available.

There is a desire to adapt cellular or wireless networks and mobile communications devices to provide for provisioning, implementation and support for surveillance systems. For example, U.S. Patent Application Publication No. 2003/0174210 A1 by Vimpari, et al., which was published on Sep. 18, 2003, discusses a video surveillance system including a means for transmitting an alarm message over a radio path to at least one user terminal and means for taking a predetermined number of pictures at predetermined intervals, means for transmitting pictures that have been processed as required by the transmission method over the radio path to a connecting device and means for further transmitting pictures that have been reprocessed as required by the transmission method, if necessary, over the radio path to at least one user terminal. However, the application by Vimpari, et al., and the art as a whole, does not address certain problems of implementation.

Therefore, a desire remains for methods and systems for adapting wireless communication networks to provision and support surveillance of a location via a mobile communications device.

SUMMARY OF THE INVENTION

A surveillance system can include a subscriber database and a mobile switching center.

For example, the subscriber database can include subscription information of a subscriber including identification information of a mobile communications device associated with the subscriber and at least one respective surveillance sensor internet protocol address of at least one respective surveillance sensor associated with the subscriber.

The mobile switching center (MSC) is operative to communicate with the associated mobile communications device and the subscriber database. The MSC is operative to receive at least one of the at least one respective surveillance sensor internet protocol address from the subscriber database and use the at least one received respective surveillance sensor internet protocol address to request (or connect to) surveillance sensor information from the respective at least one surveillance sensor over an internet protocol based network. The MSC receives the surveillance sensor information from the respective at least one surveillance sensor over the internet protocol based network and transmits the surveillance sensor information to the associated mobile communications device over a mobile communications network.

The system can further include at least one respective surveillance sensor associated with the subscriber and located at a place to be monitored, the at least one respective surveillance sensor having assigned thereto the at least one respective surveillance sensor internet protocol address and being in communication with the internet protocol based network according to the at least one internet protocol address.

Additionally, the system can include a mobile communications device associated with the subscriber, the mobile communications device including an output device for providing surveillance sensor information from at least one of the at least one respective surveillance sensor to a user, the mobile communications device being operative to communicate with the mobile switching center over the mobile communications network.

For example, the mobile communications device includes instructions for providing a configurable selection menu to a user to allow the user to select the at least one respective surveillance device and indicate to the mobile switching center that surveillance information from the at least one surveillance device is desired and for transmitting a message indicating the selection to the mobile switching center.

For instance, the at least one surveillance sensor can include at least one of a camera and a microphone.

A method for providing surveillance of a location can include provisioning a subscriber database of a mobile communications network with at least one surveillance sensor internet protocol address of at least one surveillance sensor in association with at least one set of subscription information associated with a subscriber and at least one mobile communications device of the subscribe, determining that it is appropriate to start a surveillance session related to at least one of the at least one surveillance sensor, receiving at least one of the at least on surveillance sensor internet protocol address from the subscriber database, based on the determination, connecting to the at least one surveillance sensor using the at least one surveillance sensor internet protocol address, receiving surveillance sensor information from the at least one surveillance sensor and transmitting the received surveillance sensor information to at least of the at least one mobile communications device.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED DESCRIPTION

Figure 1:
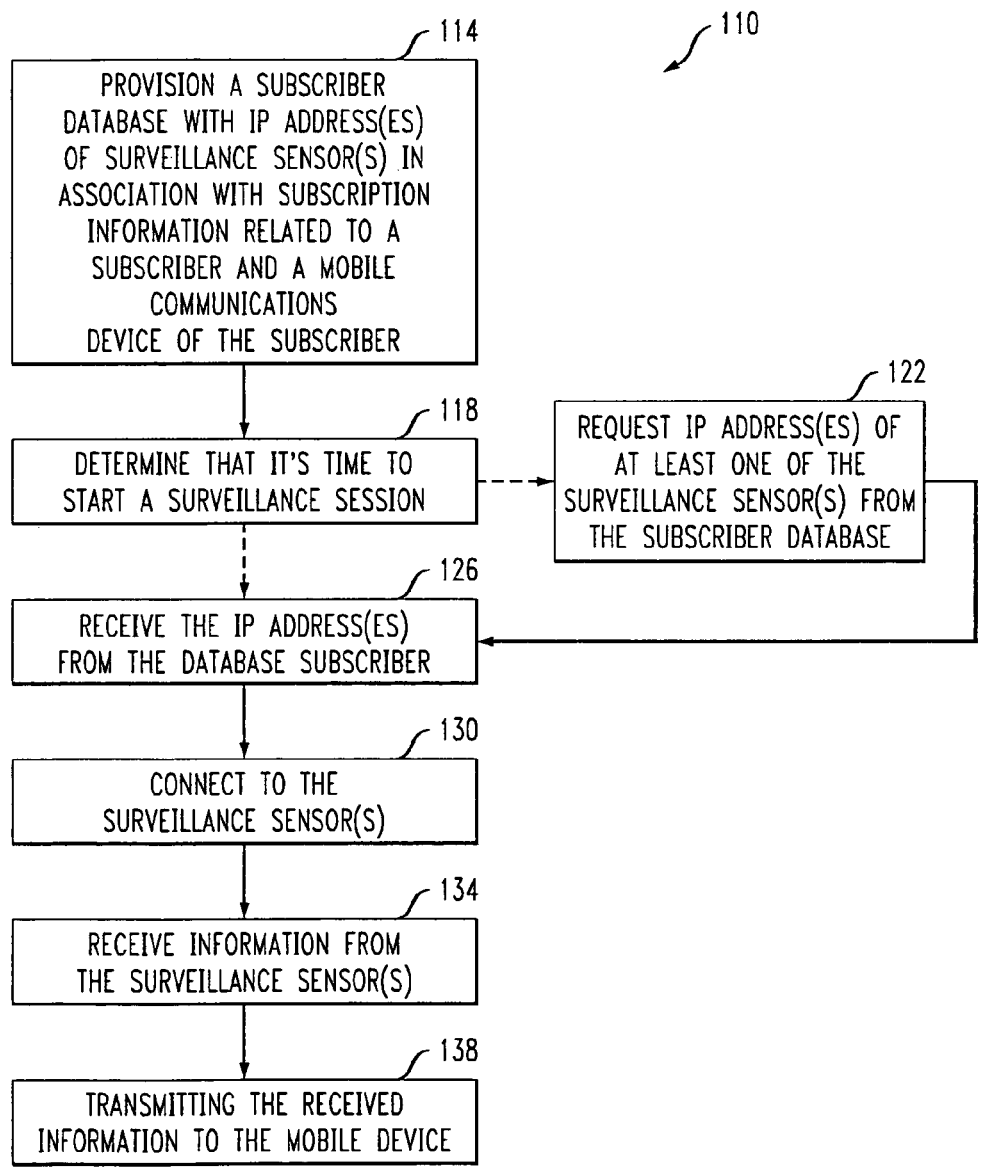
FIG. 1 is a flow chart outlining a method for providing surveillance of a location.

Referring to FIG. 1, a method 110 for providing surveillance of a location can include provisioning 114 a subscriber database (see FIG. 3) with one or more internet protocol (IP) address of one or more surveillance sensors in association with subscription information related to a subscriber and one or more mobile communications device (see FIG. 3) of the subscriber, determining 118 that it is time to start a surveillance session for the subscriber, optionally, requesting 122 one or more of the one or more surveillance sensor IP address from the subscriber database, receiving 126 one or more surveillance sensor IP address from the subscriber database, connecting 130 to one or more surveillance sensor using the received 126 one or more surveillance sensor IP address, receiving 134 information from the one or more surveillance sensor according to the one or more surveillance sensor IP address and transmitting 138 the received information to the mobile communications device.

Figure 2:
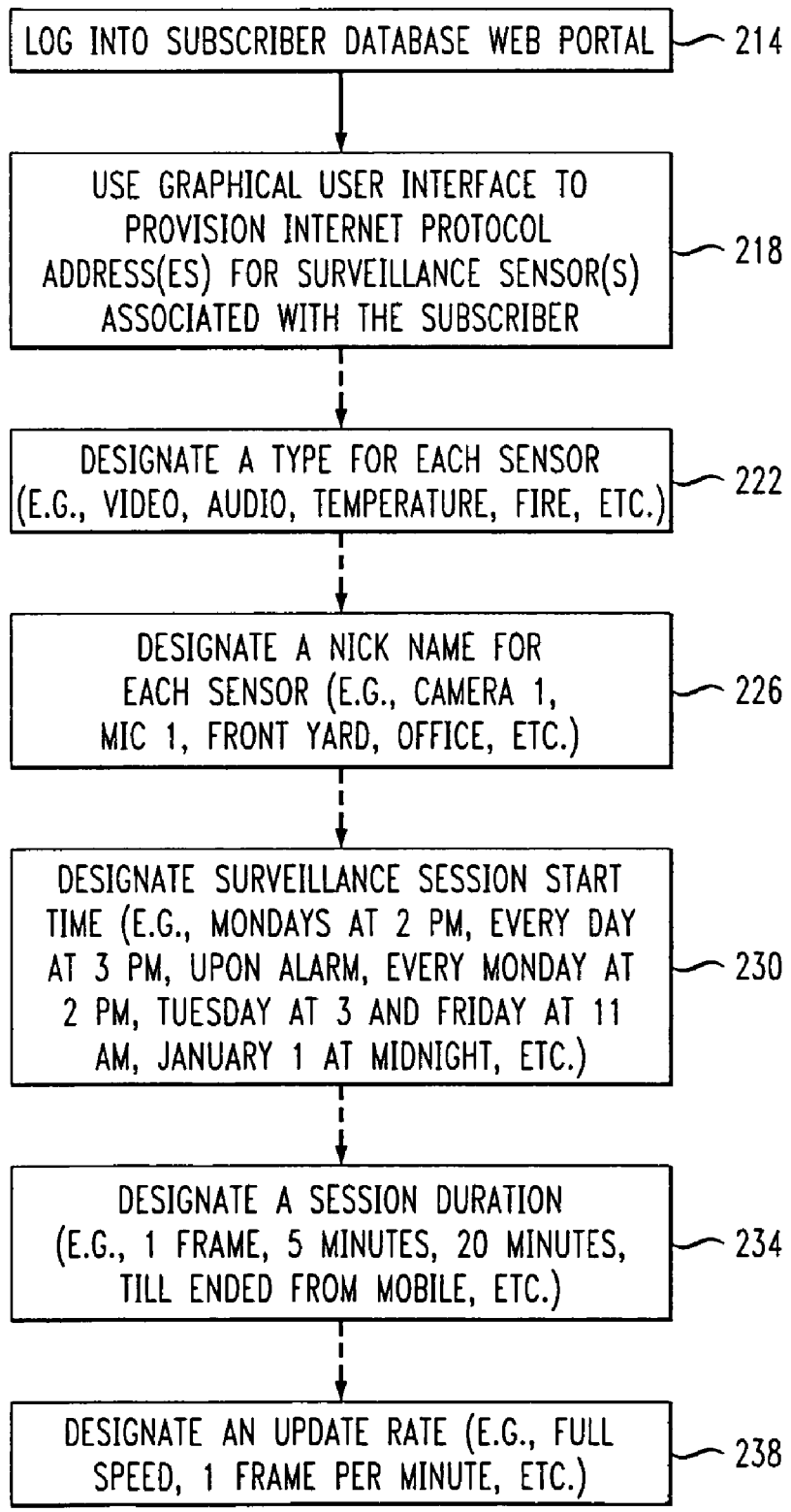
FIG. 2 is a flow chart outlining a method of provisioning a subscriber database in accord with the method of FIG. 1.

For example, with reference to FIG. 2, provisioning 114 the subscriber database can include a subscriber logging 214 into a subscriber database web portal and using 218 a graphical user interface (GUI) to provision or enter one or more internet protocol address for one or more respective surveillance sensor associated with the subscriber. Additionally, provisioning 114 the subscriber database can include one or more of designating 222 a type for each sensor, designating 226 a nickname for each sensor, designating 230 a surveillance session start time, designating 234 a session duration, designating 238 an update rate and/or designating other or additional surveillance session parameters.

Alternatively, provisioning 114 the subscriber database can involve a communication between the subscriber and a mobile communications network system representative. For example, the subscriber may call or write a subscription service department of the mobile communications service provider and provide the requisite IP address or addresses of the surveillance sensors to be provisioned as well as any desired optional information and request that surveillance session services be included in the subscribers' subscription or service plan. The subscription services employee may then provision 114 the appropriate subscriber database according to the received information and requested services.

Figure 3:
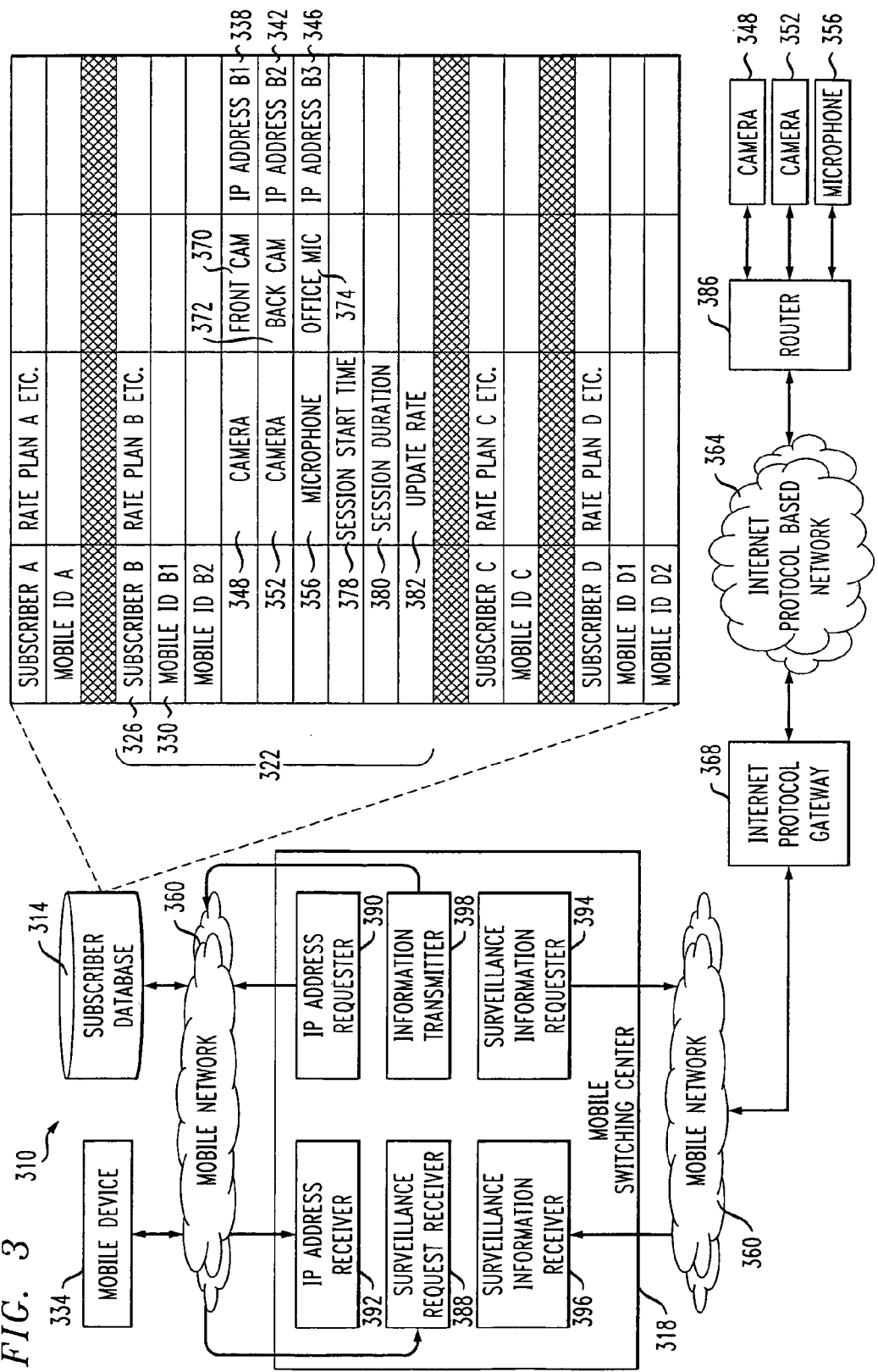
FIG. 3 is a block diagram of a system that is operative to perform the method of FIG. 1.

For example, with reference to FIG. 3 (and FIG. 1) a surveillance system 310 can include a subscriber database 314 and a mobile switching center (MSC) 318.

The subscriber database 314 can be provisioned 114 to include subscription information (e.g., 322) of a subscriber (e.g., 326) including identification information (e.g., 330) of a mobile communications device 334 associated with the subscriber 326 and other information such as flags and parameters that describe, define or customize the services provided to the subscriber. For example, the subscriber database may include information that identifies the rate plan the subscriber is to be billed under and/or configures services such as call waiting, call forwarding and voice mail services, etc., subscribed to by the subscriber. Additionally, the subscription information 322 can include at least one respective surveillance sensor internet protocol (IP) address 338, 342, 346 of at least one respective surveillance sensor 348, 352, 356 associated with the subscriber.

The mobile switching center (MSC) 318 can be operative to communicate with the associated mobile communications device 334 and the subscriber database 314. For example, the MSC 318 communicates with the mobile device 334 and subscriber database 314 over a mobile network 360. For instance, the MSC 318 is operative to receive 126 at least one respective surveillance sensor internet protocol address (e.g., 338) from the subscriber database 314, to use the at least one received respective surveillance sensor internet protocol address 338 to connect 130 to request surveillance sensor information from, the respective at least one surveillance sensor (e.g., 348) over an internet protocol-based network 364, to receive 134 the surveillance sensor information from the respective at least one surveillance sensor 338 over the internet protocol-based network 364 and to transmit 138 the surveillance sensor information to the associated mobile communications device 334 over the mobile communications network 360. For example, the MSC 318 uses the services of an internet protocol gateway 368 to connect 130 to the surveillance sensors (e.g., 348, 356). The mobile communications device 334 presents the surveillance sensor information to a user of the device 334. For instance, the mobile device 334 displays camera images, displays sensor data, plays microphone audio or otherwise provides the surveillance information to the user.

Returning now to FIG. 2, logging 214 into the subscriber database web portal can include, for example, connecting to a webpage or web portal server (not shown) associated with the subscriber database 314 from an internet-enabled mobile device (e.g., 334) or from some other device connected to the internet, such as a home or office computer. If a mobile device is used, a login process may recognize the subscriber (e.g., 326) by a mobile ID (e.g., 330) of the mobile device. For example, the mobile device may transmit a mobile identification number (MIN) and/or a mobile station integrated services digital network number (MSISDN) associated with the mobile device (e.g., 334) to the web server or portal as part of the connection process. Alternatively, the subscriber may enter a user name and password through either the mobile device or the other internet-connected platform.

Using 218 the graphical user interface can include, for example, designating a menu selection for provisioning surveillance services. Depending on the level of flexibility supported, the web portal (not shown) may present the subscriber with an entry box for entering an IP address of a single surveillance sensor of a single supported type, such as, for example, a video or still frame camera, microphone, camera and microphone combination, thermometer, humidity or moisture sensor, medical device or any other internet-enable device that is supported by the service. Alternatively, the web portal may provide the subscriber with entry boxes for designating a plurality of IP addresses (e.g., 338, 342, 346) and, for example, for designating 226 a plurality of nicknames (e.g., 370, 372, 374) associated respectively therewith.

In systems wherein a variety of surveillance sensor types are supported and wherein data from different types of devices is handled or transferred differently (e.g., with different data rates, quality of service, connection duration, etc.) the web portal may provide the subscriber with an entry box or boxes for designating 222 a type (e.g., 348, 352, 356) for each respective IP address (e.g., 338, 342, 346) and/or nickname (e.g., 370, 372, 374).

Again, depending on the level of service provided, other service parameters might be designated through the use 218 of the graphical user interface. For example, the subscriber might be provided with a mechanism for designating a recurring or one-time only surveillance session start time 378. For example, the subscriber may be able to designate that a surveillance session should be started Mondays at 2 p.m., every day at 3 p.m., upon an alarm (e.g., if a burglar alarm senses an intrusion, fire alarm senses a fire or moisture detector senses a flood), every Monday at 2 p.m., Tuesday at 3 and Friday at 11 a.m. and/or on January 1$^{st}$ at midnight, etc. Additionally, or alternatively, the subscriber may be able to use the graphical user interface to designate 234 a session duration. For instance, the subscriber may be able to designate 234 that a surveillance session include only a single still image or video frame or that data be collected for a particular period of time, such as 5 minutes, or 20 minutes, or until the session is ended manually from the mobile device, etc. Other parameters may be designated in order to customize the surveillance service and/or manage costs associated therewith. For example, the graphical user interface or other mechanism may be used to designate an update rate 382. For instance, the subscriber may designate 238 that full speed video is desired, or that one frame or picture per minute is sufficient.

Surveillance sessions might be further customized or automated. For example, the subscriber database 314 may be provisioned 114 with a sensor rotation pattern. For instance, the subscriber may designate and provision 114 the subscriber database 314 with information describing a desired sensor rotation pattern. For instance, the subscriber may provision 114 the database to indicate that surveillance session should include one minute of front camera 370, 348 data followed by one minute of back camera 372, 352 data and 30 seconds of office microphone 374, 356 data. Alternatively, office microphone data may be collected continuously while image data collected switches between data from the front, camera 370, 348 and the back camera 372, 352.

As indicated above, provisioning 114 the subscriber database 314 can be achieved without use of the web portal. For example, the subscriber may request the addition of surveillance service to the subscriber's subscription and indicate a number and type of surveillance sensors to be included in the system. If the mobile communications network services provider is also an internet services provider of the subscriber or has a business or working relationship with an internet service provider of the subscriber, then a customer service representative of the mobile communications network service provider, or technician associated therewith, may be able to determine the required IP address(es) and related port or node information and provision 114 the subscriber database 314 accordingly.

With further reference to FIG. 1, the determination 118 that it is time to start a surveillance session can be based on a command or request received from the mobile communications device 334. For example, an SS7 network Initial Address Message (IAM) or a CDMA call origination message may be adapted for use as a surveillance session start request message.

For instance, the mobile communications device 334 may be adapted to provide a user with a function selection menu. Using the function selection menu to select a start-surveillance-session option may cause the mobile communications device 334 to generate and transmit such an adapted IAM or CDMA call origination message to the mobile switching center 318.

In general, an MSC is a switching system that provides connection and hand-off services (not shown) for mobile communications devices, thereby connecting the mobile communication devices to other such mobile devices and to other communication networks, such as wireline or landline networks, including, but not limited to, POTS, ISDN and internet protocol-based networks. An MSC communicates with mobile devices through other mobile communications network elements, such as cell sites (not shown), which include radio base stations (not shown). An MSC communicates with the base stations, other mobile communications network elements and wireline or landline networks through cable trunks and/or fiber optic cable or other technologies and communicates with some other networks through the use of various gateways. IAM and CDMA call origination messages are illustrative mechanisms by which mobile communication devices request establishment of a connection, or the placement of a call, between the respective mobile device and another network element that is reachable by the MSC.

In addition to these general MSC functions (not shown), the mobile switching center 318 of the illustrated embodiment can be adapted to receive and interpret the adapted message discussed above. For example, the message may include an ID of 330 of the mobile device 334 and a start-surveillance-request flag or parameter. Additionally, or alternatively, the message may designate one or more surveillance sensors. For instance, the mobile communications device 334 may be configured to offer a subscriber that selects a start-surveillance-session function a further selection menu displaying nicknames (e.g., 370, 372, 374) of available or provisioned surveillance sensors, thereby allowing the subscriber or other user to designate one or more of the surveillance sensors (e.g., 348, 352, 356) to be included in the requested surveillance session. Furthermore, other session parameters, such as session duration, update rate, sensor rotation descriptions and the like, may be designated from the mobile device 334 and included in the session initiation message.

Alternatively, determining 118 that it is time to start a surveillance session may be based on information provisioned 114 in the subscriber database 314.

For example, provisioning 114 a session start time 378 can trigger the configuring and initiating of a timer. The timer (not shown) can be associated with the subscriber database 314. In one alternative, the timer is associated with the MSC 318. If the timer is associated with subscriber database 314, when the timer expires, the subscriber database 314 generates and transmits a surveillance session start message to the mobile switching center 318. For instance, the subscriber database 314 includes one or more provisioned surveillance sensor IP address (e.g., 338, 342, 346) associated with the subscriber (e.g., 326) and, if provisioned, session duration 380 and/or update rate 382 information. When the MSC 318 receives the session start message from the subscriber database 314, the MSC 318 receives 126 the appropriate provisional surveillance sensor IP address(es) (e.g., 338) included therein without first requesting 122 the IP addresses from the subscriber database 314.

If the determination 118 that it is time to start a surveillance session is based on a session-start-message received from the mobile communications device 334 or if the expired timer is associated with the MSC 318, the MSC 318 generates surveillance sensor IP address request message requesting one or more surveillance sensor IP address and optionally other session description information (e.g., 380, 382) from the subscriber database.

In response, the subscriber database 314 transmits the requested information to the MSC 318, which receives 126 it.

By whichever mechanism the one or more surveillance sensor IP address is received 126, the MSC uses the one or more surveillance sensor IP address to connect 130 to the surveillance sensors (e.g., 348, 352, 356) over an internet protocol-based network (e.g., 364).

For example, the MSC 318 communicates with an internet protocol gateway (e.g., 368) over elements of the mobile communications network 360. For instance, the MSC 318 sends messages including the one or more IP address (338, 342, 346) to the internet protocol gateway 368. The internet protocol gateway 368 processes or transforms the mobile communications network compatible messages from the MSC 318 into appropriate Transmission Control Protocol/Internet Protocol (TCP/IP) messages which establish a connection or context between the surveillance sensors 348, 352, 356 (and/or a router 386 associated therewith) and the internet protocol gateway 368. With the connection established 130, data from the surveillance sensors 348, 352, 356 flows through the internet protocol gateway 368 which processes, transforms or packages the data for compatibility with the mobile communications network 360 and transmits the surveillance information from the connected 130 surveillance sensors to the MSC 318, where it is received 134 and transmitted 138 to the mobile device 334.

Optionally, and where supported, messages between the MSC 318, internet protocol gateway 368 and surveillance sensors 348, 352, 356 include commands or parameters controlling the update rate and activity of selected sensors. Alternatively, connections are established 130 and torn down on a rotating basis in order to provide the mobile communications device 334 with, for example, surveillance information from a first camera (370), a second camera (e.g., 372) and a first microphone (e.g., 374) on a rotating or overlapping basis. According to session parameters provisioned 114 in the subscriber database or according to session modification commands generated with and transmitted by the mobile communications device 334.

If a provisioned 114 session duration (e.g., 380) is to control the duration of the session, a session timer (not shown) is established, based on the provisioned 114 session duration 380, concurrently with the establishment 130 of the connection to the surveillance sensors or with the determination 118 that it is time to start a surveillance session. When the session time expires, the established 130 connection is torn down and transmission 138 of surveillance information to the mobile communications device 334 is terminated. Alternatively, the connection is torn down and transmission 138 of surveillance data ceases when a session ending command is received from the mobile communications device 334 or when the mobile communications device 334 terminates the call or disconnects from the mobile communications network 360.

Embodiments may be implemented in hardware, software and combinations of hardware and software included in, for example, the subscriber database 314 and in the mobile switching center 318. Optionally, as indicated above, some embodiments are partially provided in hardware, software or combinations thereof included within the mobile communications device 334.

As shown in the illustrated embodiment, the MSC 318 can include, for example, a surveillance request receiver 388, an IP address requester 390, an IP address receiver 392, a surveillance information requester 394, a surveillance information receiver 396 and an information transmitter 398. For instance, the surveillance request receiver 388 may be operative to determine 118 that it is time to start the surveillance session. Based on this determination, the IP address requester 390 may request 122 an IP address of at least one surveillance sensor from the subscriber database 318. The IP address receiver 392 may be operative to receive 126 the requested 122 IP address(es). The surveillance information requester 394 can be operative to connect 130 or request information from the surveillance sensor(s) and the surveillance information receiver 396 can be operative to receive 134 information from the surveillance sensor(s). The information transmitter 398 may then receive the surveillance sensor information from the surveillance information receiver 396 and transmit 138 the information to the mobile device 334. However, in other embodiments, the MSC might not include all these functional blocks (388-398) or might include other combinations of functional blocks for performing desired aspects of the method 110 for providing surveillance of a location. For example, embodiments wherein the subscriber database 314 determines 118 that it is time to start a surveillance session might not include an IP address requester 390. Furthermore, some embodiments may include other functional blocks which combine the services of two or more of the illustrated functional blocks.

While the invention is described herein in conjunction with exemplary embodiments, it is evident that many alternatives, modifications or variations would be apparent to those skilled in the art. Accordingly, the embodiments of the invention in the preceding description are intended to be illustrative, rather than limiting, of the spirit and scope of the invention. More specifically, it is intended that the invention embrace all alternatives, modifications and variations of the exemplary embodiments described herein that fall within the spirit and scope of the appended claims or equivalents thereof.

We claim:

1. A surveillance system comprising:
   a subscriber database including subscription information of a subscriber including identification information of a mobile communications device associated with the subscriber and at least one respective surveillance sensor internet protocol address of at least one respective surveillance sensor associated with the subscriber; and
   a mobile switching center that is operative to communicate with the associated mobile communications device and the subscriber database, to receive at least one of the at least one respective surveillance sensor internet protocol address from the subscriber database, to use the at least one received respective surveillance sensor internet protocol address to request surveillance sensor information from the respective at least one surveillance sensor over an internet protocol based network, to receive the surveillance sensor information from the respective at least one surveillance sensor over the internet protocol based network and to transmit the surveillance sensor information to the associated mobile communications device over a mobile communications network.

2. The system of claim 1 further comprising:
   at least one respective surveillance sensor associated with the subscriber and located at a place to be monitored, the at least one respective surveillance sensor having assigned thereto the at least one respective surveillance sensor internet protocol address and being in communication with the internet protocol based network according to the at least one internet protocol address.

3. The system of claim 2 wherein the at least one respective surveillance sensor comprises at least one of a camera and a microphone.

4. The system of claim 1 further comprising:
   a mobile communications device associated with the subscriber, the mobile communications device including an output device for providing surveillance sensor information from at least one of the at least one respective surveillance sensor to a user, the mobile communications device being operative to communicate with the mobile switching center over the mobile communications network.

5. The system of claim 4 wherein the mobile communications device includes instructions for providing a configurable selection menu to a user to allow the user to select the at least one respective surveillance device and indicate to the mobile switching center that surveillance information from the at least one surveillance device is desired and for transmitting a message indicating the selection to the mobile switching center.

6. The system of claim 1 wherein the mobile switching center is further operative to receive a message from the associated mobile communications device designating at least one of the at least one respective surveillance device and to respond to the message by requesting the respective at least one surveillance sensor internet protocol address of the designated at least one respective surveillance device from the subscriber database, receiving the at least one requested respective surveillance sensor internet protocol address from the subscriber database, using the at least one received surveillance sensor internet protocol address to request the surveillance sensor information from the respective at least one surveillance sensor over the internet protocol based network, receiving the surveillance sensor information from the respective at least one surveillance sensor over the internet protocol based network and transmitting the surveillance sensor information to the mobile device over the mobile communications network.

7. The system of claim 6 wherein the mobile switching center is operative to receive the message from the associated mobile communications device by receiving one of: a call origination message including an identification of the associated mobile communications device and an identification of the at least one respective surveillance device, an sins message including an identification of the associated mobile communications device and an identification of the at least one respective surveillance device, and a text message including an identification of the associated mobile communications device and an identification of the at least one respective surveillance device.

8. The system of claim 1 wherein the mobile switching center is further operative to receive a message from at least one of the associated mobile communications device and the subscriber database designating at least one of an update rate and a duration and to at least one of: a) request updated surveillance sensor information from the respective at least one surveillance sensor, receive the updated surveillance sensor information from the respective at least one surveillance sensor and transmit the surveillance sensor information to the associated mobile device at the designated update rate and b) continuously receive updated surveillance sensor information from the respective at least one surveillance sensor and transmit the surveillance sensor information to the mobile device for a time period corresponding to the duration.

9. The system of claim 1 wherein the mobile switching center is further operative to determine an arrival of a pre-designated time for a beginning of a surveillance session and to determine at least one pre-designated surveillance sensor indication and, based on that determination, request surveillance sensor information from the at least one pre-designated surveillance sensor, receive the surveillance sensor information from the at least one pre-designated surveillance sensor and transmit the surveillance sensor information to the mobile device.

10. The system of claim 9 wherein the subscriber database further includes at least one pre-designated surveillance session start time in association with the subscription information and wherein the mobile switching center is operative to determine the arrival of the pre-designated time for the beginning surveillance session by at least one of a) receiving a message from the subscriber database indicating a pre-designated surveillance session start time and at least one surveillance sensor internet protocal address, starting a timer based on the indicated surveillance session start time and determining that the timer has expired and b) receiving an indication from the subscriber database that the pre-designated start time has arrived and at least one surveillance sensor internet protocal address.

11. The system of claim 9 wherein the subscriber database further includes a timer that is operative to determine the arrival of the pre-designated surveillance session start time and wherein the subscriber database is operative to transmit the indication that the pre-designated time has arrived and the at least one pre-designated surveillance sensor indication to the mobile switching center.

12. The system of claim 1 further comprising:
a router that is operative to provide a connection for the at least one respective surveillance sensor to the internet protocol based network.

13. The system of claim 1 further comprising:
an internet protocol gateway in communication with the mobile switching center and operative to act as an interface to the internet protocol based network for the mobile switching center.

14. A method for providing surveillance of a location, the method comprising:
provisioning a subscriber database with at least one surveillance sensor internet protocol address of at least one surveillance sensor in association with at least one set of subscription information associated with a subscriber and at least one mobile communications device of the subscriber;
determining that it is appropriate to start a surveillance session related to at least one of the at least one surveillance sensor;
receiving at least one of the at least one surveillance sensor internet protocol address from the subscriber database, based on the determination;
connecting to the at least one surveillance sensor using the at least one surveillance sensor internet protocol address;
receiving surveillance sensor information from the at least one surveillance sensor; and
transmitting the received surveillance sensor information to at least one of the at least one mobile communications device.

15. The method of claim 14 further comprising:
requesting at least one of the at least one surveillance sensor internet protocol address from the subscriber database, based on the determination.

16. The method of claim 15 wherein provisioning the subscriber database comprises:
a subscriber logging into a web portal associated with the subscriber database;
using a graphical user interface of the web portal to designate a number of respective surveillance sensors to be associated with the subscriber information of the subscriber and to enter a surveillance sensor internet protocol address for, and associated with, each respective one of the designated number of surveillance sensors.

17. The method of claim 16 wherein provisioning the subscriber database further comprises:
using the graphical user interface of the web portal to at least one of: a) indicate a respective surveillance sensor type in association with each of respective surveillance sensor internet protocol address and b) designate a respective nickname or alias for each of the at least one respective surveillance sensor internet protocol address.

18. The method of claim 17 wherein provisioning the subscriber database further comprises:

using the graphical user interface of the web portal to at least one of: a) designate a surveillance session start time for at least one of the at least one surveillance sensor, b) designate a surveillance session duration for at least one of the at least one surveillance sensor c) designate an surveillance session update rate for at least one of the at least one surveillance sensor.

19. The method of claim 14 wherein determining that it is appropriate to start the surveillance session comprises at least one of: a) receiving a message from one of the at least one mobile communications device indicating an identity of the one mobile communications device and at least one respective nickname associated with at least one respective surveillance sensor internet protocol address and b) receiving a message from one of the at least one mobile communications device indicating an identity of the one mobile communications device and a request that a surveillance session be started.

20. The method of claim 14 wherein determining that it is appropriate to start the surveillance session comprises:
    receiving a message from the subscriber database indicating a pre-designated surveillance session start time,
    starting a timer based on the indicated surveillance session start time and determining that the timer has expired.

* * * * *